(12) United States Patent
Sheng et al.

(10) Patent No.: US 6,576,333 B2
(45) Date of Patent: *Jun. 10, 2003

(54) COMPOSITE MATERIALS WITH NEGATIVE ELASTIC CONSTANTS

(75) Inventors: Ping Sheng, Kowloon (HK); Rongfu Xiao, Laguna (HK); Weijia Wen, Kowloon (HK); Zheng You Liu, Kowloon (HK)

(73) Assignee: The Hong Kong University of Science & Technology, Kowloon (HK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,532

(22) Filed: Apr. 3, 1998

(65) Prior Publication Data

US 2002/0114928 A1 Aug. 22, 2002

(51) Int. Cl.[7] ................................................. B32B 5/16
(52) U.S. Cl. ........................ 428/323; 428/327; 428/328; 428/378; 428/403; 428/407
(58) Field of Search ................................ 428/323, 327, 428/328, 378, 403, 407, 357

(56) References Cited

U.S. PATENT DOCUMENTS

| 4,544,600 A | * 10/1985 | Kern .......................... 428/323 |
| 5,512,715 A | 4/1996 | Takewa et al. ............. 181/295 |
| 5,564,241 A | 10/1996 | Ogorchock et al. ...... 52/309.12 |
| 5,618,617 A | * 4/1997 | Uchida et al. .............. 428/323 |

* cited by examiner

Primary Examiner—Cynthia H. Kelly
Assistant Examiner—B. Shewareged
(74) Attorney, Agent, or Firm—Burns, Doane, Swecker & Mathis, LLP

(57) ABSTRACT

This invention provides a composite material having a matrix of structural material containing embedded zones of soft elastic material and zones of solid relatively high density material within the soft elastic material. By selecting a particular resonance frequency for the subunits of soft elastic material and solid high density material, frequencies just lower than the resonance frequencies will be unable to propagate through the material and be strongly reflected or absorbed. Such material may be used in the manufacture of filters or shields against particular target frequencies. Subunits having a variety of resonance frequencies may provide a broader range of frequencies that the material may shield.

26 Claims, 4 Drawing Sheets

COMPOSITE MATERIALS WITH NEGATIVE ELASTIC CONSTANTS

FIELD OF THE INVENTION

This invention relates to composite materials that display negative elastic constants, in particular, although not necessarily solely, for use in materials for low frequency sound reflection, absorption or sound insulation.

BACKGROUND TO THE PRIOR ART

A variety of materials exist and endeavour to insulate against sound transmission. Examples of such existing formulations include acoustic panels such as described in U.S. Pat. No. 5,564,241 in which an acoustic layer is provided in or bonded to a structural layer. Other materials such as that described in U.S. Pat. No. 5,512,715 are highly complex composite materials. In all cases, difficulty is found in providing a shield to low frequency sound waves. The greatest difficulty is that, in order to cause sound wave scattering or reflection, the size of the scatterers must be of a similar order to the wave length. As low frequency sound has a long wave length, it follows that shielding materials would have to be either very thick or very soft. Naturally, very thick materials are not suitable in many applications including the building industry where there may be limitations on the thickness which can be accommodated. Very soft materials allow a thinner layer to be used as the soft materials shorten the wavelength, however, the use is limited by the structural weakness of the soft materials.

It is normal that static elastic constants of materials are positive. This is a required condition of structural stability otherwise a spontaneous deformation allows the system to reach a lower elastic energy level. Instability is implied should the static elastic constants not be positive. However, should negative elastic constants be possible, at least at particular frequencies, sound waves at those frequencies would be unable to propagate in such a material. Therefore, a material capable of having negative effective elastic constants at low frequencies may allow a relatively thin portion of material to act as a filter or shield against a particular target frequency.

OBJECT OF THE INVENTION

It is an object of the present invention to provide a composite material with negative elastic constants over at least a particular frequency ranges to provide a shield or insulation against such frequencies.

SUMMARY OF THE INVENTION

Accordingly, in a first aspect, the invention may be seen to consist in a composite material having a matrix material being a general structural material, zones of soft elastic material within the matrix and embedded zones of solid, relatively high density and high rigidity material within the soft elastic material.

Accordingly, in a second aspect, the invention consists in a method of making a composite material having negative elastic constants at finite frequencies comprising embedding solid particles of reasonably high density and high rigidity within regions of soft elastic material and said regions of soft elastic material being embedded within a matrix material being a suitable structural material.

DESCRIPTION OF THE DRAWINGS

The invention will now be described with reference to the drawings in which.

DETAILED DESCRIPTION OF PREFERRED EMBODIMENTS

This invention relates to composite materials with negative elastic constants. Primarily, the composite material may be used in the reduction of sound transmission within particular frequency ranges. Therefore, the composite material may be particularly useful as a sound insulator or shield against, in particular, low frequency sound. The composite material may be used in a variety of applications including the normal need for sound insulation as well as the fabrication of elastic wave guides and elastic wave reflectors.

To provide structural stability, it is a normal pre-requisite that the static elastic constants are positive. Negative static elastic constants may otherwise cause a spontaneous deformation so that the material can reach a lower elastic energy level. However, at finite frequencies and in a composite material containing two or more subunits, negative effective elastic constants can occur without violating the structural stability. In other words, while the microscopic elastic constants are positive throughout the composite material, the effective stress as seen by a propagating wave can be 180° out of phase with the effective strain within certain frequency ranges. This concept of negative effective elastic constants is valid provided the microstructure scale of the composite is much smaller than the wave length. It has been found that such composites have novel and unexpected properties.

In a preferred embodiment, such a composite material may possess one or more low frequency ranges within which the effective elastic constants are negative. These frequency ranges may be tunable through the variation of the design parameters of the composites. Such give elastic constants will inhibit the propagation of elastic waves in those frequency ranges. The waves would be evanescent in nature, i.e. incident waves in those frequency ranges would decay exponentially from the incident interface.

The basic principles of the composite fabrication will now be described as reference to the drawings and at least one preferred embodiment.

By definition, the elastic constants are the proportionality constants between stress and strain. They are the elastic response functions. A negative elastic constant simply means that the stress response is 180° out of phase with the strain.

As note in that a response function switches sign when passing through the resonance frequency. For example, when there is a resonance frequency $\omega_o$, then at frequencies higher than $\omega_o$, the system response would lag behind the applied source by 180° due to the inertia of the system. Therefore, it can be concluded that to induce negative elastic constants, we can decide composite materials with low frequency elastic resonances.

Figure 1:
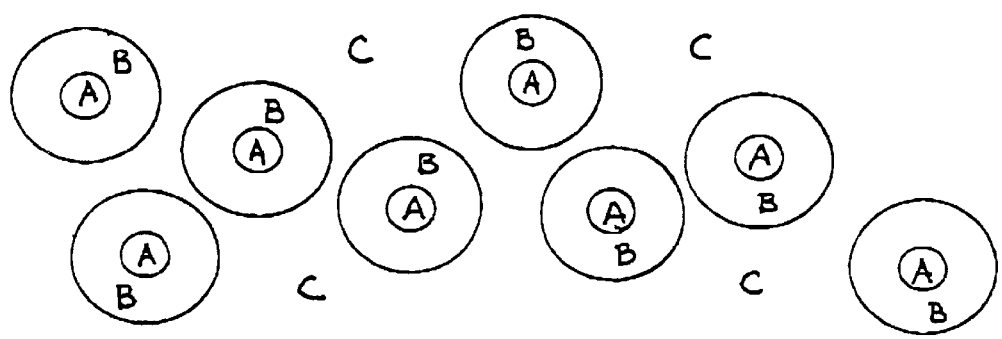
FIG. 1 shows a representative cross section through one possible embodiment of the invention.

Referring to FIG. 1, a three-component composite microstructural unit as shown may possess certain resonances. In FIG. 1, "A" denotes solid particle made from a material with relatively high density and high rigidity such as steel or tin. "B" denotes a soft elastic material surrounding the higher density and higher rigidity material such as rubber. Finally, "C" denotes the matrix material which can be any arbitrary structural material or plastic, polymer-cement composite, organic glass, etc.

Elastic contacts may be assumed for the interfaces between "A" and "B" and also between "B" and "C". Due to the existence of the soft elastic material "B" between two high rigidity materials "A" and "C", there can be low-frequency resonances caused by the relative motion between the particle "A" and the matrix. The particular resonance frequency is determined by the elastic constant of the soft material "B" and the densities of the materials "B" and the solid particle "A".

Many resonant modes are possible. The lowest frequency resonant mode will be due to the center-of-mass motion of the particle relative to the matrix. Higher frequency modes will arise from the resonant standing-wave modes of the soft elastic material.

Due to the small size of the coated particles "A" as compared to the low frequency wavelength and due to the extremely large impedance mismatch between the matrix material and the soft coating material "B", there can only be minimal energy transfer from a propagating wave to the scatterers. This situation changes drastically around the resonance frequencies. At the frequencies close to the resonance frequencies, the effective impedance of the combined "A" and "B" unit increases and wave energy can be transferred to the resonant scatterers. In particular, at frequencies just lower than the resonance frequencies the effective elastic constant can be negative. Consequently, at those frequencies the waves would be unable to propagate and would also be strongly reflected or absorbed.

EXAMPLE 1

An example of a fabrication process and experimental data is now given for a particular embodiment.

Relatively monodispersed metal balls were first surface treated with diluted $H_2O:HCl:H_2O_2$ (5:1:1) and then heated in the oven at 80° C. for two hours, for the purpose of roughening the surface. The treated balls were coated with a silicone sealant, which was diluted with mineral turpentine. The rubber layer coated on the balls was left to set for ten hours. Finally, the rubberized metallic particles were mixed with fast-setting epoxy and then shaped into plates with a thickness of 12 mm.

The measurement of sound transmission was carried out as follows. A vibraphone and sound detector, mounted on the bottom and top of the plate, were connected to a function generator (HP PM5139) and Dual Microphone Supply (B&K Model 5935), respectively. The microphone output was connected to a Digit Oscilloscope (HP PM3365). At fixed input voltage, the intensity of sound transmission can be read out as the frequency was varied.

Figure 2:
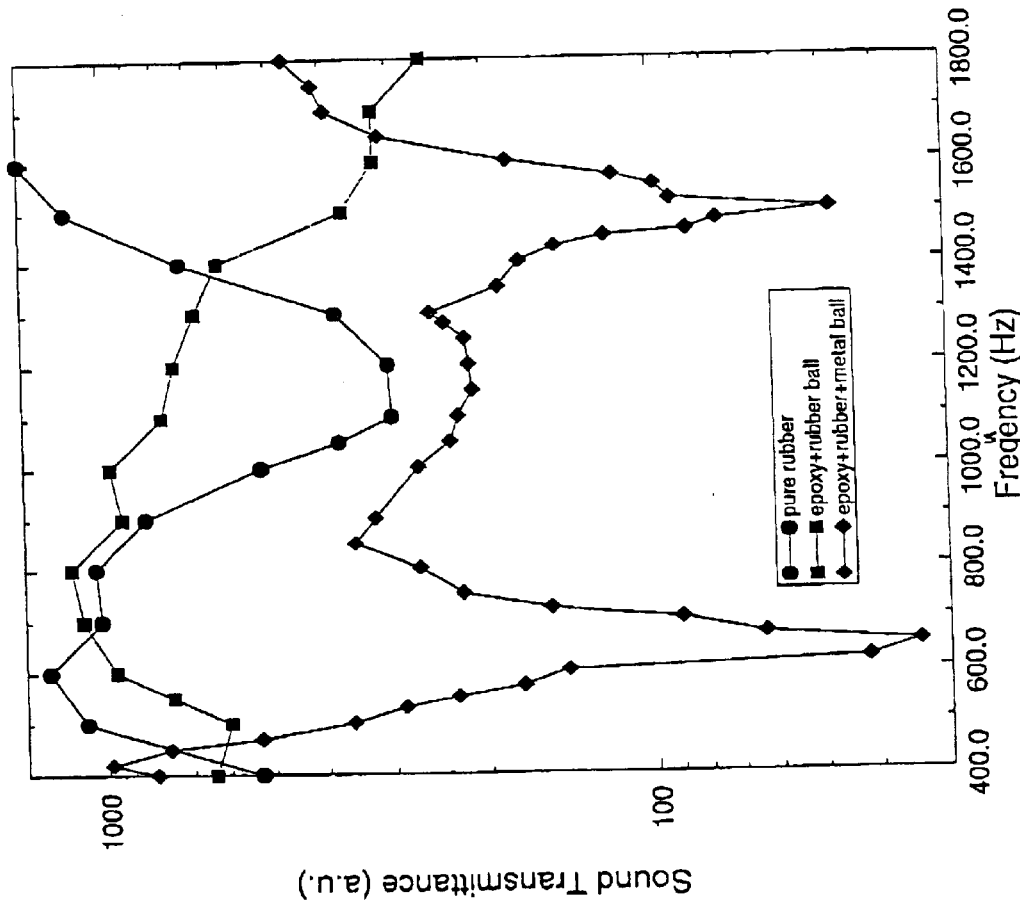
FIG. 2 shows a graph of results of one embodiment of the invention against alternative materials.

The experiment results are shown in FIG. 2. It is seen that whereas pure rubber and epoxy with rubber balls show no sign of sharp transmission dip(s), the case of epoxy+ rubberized metal balls clearly demonstrates the effectiveness of the material in cutting down the transmission within a frequency window of about 100 Hertz. At the point of transmission minimum the energy transmitted is only 3% of the low frequency limiting value, and this occurs with a thickness of the sample which is only 1/330 the wavelength in epoxy, about four meters at that frequency. A second dip is also clearly seen at a higher frequency. Since the present sample was fabricated using relatively monodispersed balls, it is envisioned that the use of polydispersed balls would broaden the frequency ranges of the dips. Moreover, if the mean size were varied, the minimum transmission frequency would shift also—such that the larger the balls, the lower the resonance frequency and vice versa.

Figure 3:
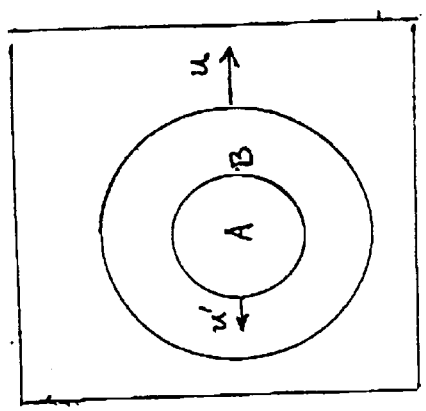
FIG. 3 is a schematic view of one possible embodiment of the invention.

In order to obtain an understanding of the observed phenomenon and to confirm the basic idea of this invention, numerical calculations were carried out. We considered a cell geometry with geometry shown in FIG. 3. Since the matrix medium is fairly rigid, a low frequency wave propagating in the material would have a wavelength that is very large compared to the cell. Consequently, we can treat the motion of the cell's interface with the matrix as simply a uniform displacement in the zeroth order approximation. The solid particle "A" is treated as completely rigid. The resulting coupled elastic equation of motion and equation of state (the stress-strain relation) were solved analytically. Again, since the cell is much smaller than the wavelength, the effective longitudinal elastic constant C as seen by the propagating wave would relate the effective force $\bar{f}$ with the displacement $\bar{u}$ by the relation $\bar{f}=k^2 C \bar{u}$, where k is the wavevector. Here we consider the longitudinal wave.

Figure 4:
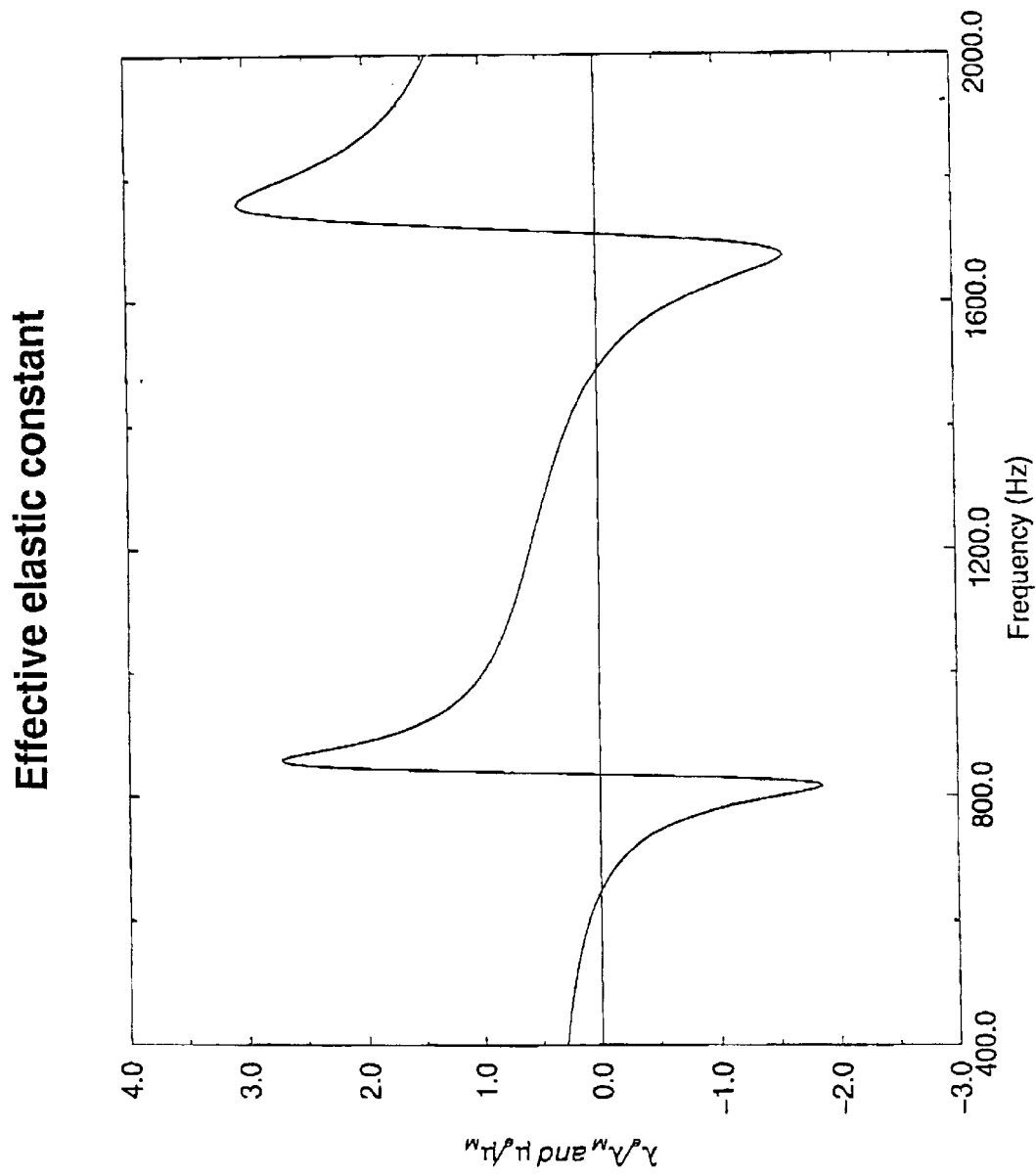
FIG. 4 shows a graphical representation of the results of a theoretical model of one embodiment of the invention.

The calculated result using the realistic experimental parameters (Lame constants of the epoxy are taken as $\lambda=2.4\times10^9$ N/m², $\mu=2.4\times10^9$ N/m², the density is given by 1.3 g/cm³. Those for the soft rubber are given by $\lambda=1.2\times10^5$ N/m², $\mu=4.4\times10^4$ N/m², and density=1.05 g/cm³. The metal sphere is taken to be rigid, with density of 7.8 g/cm³) are shown in FIG. 4. It is seen that there are two resonances between 500 and 1800 Hz, just as seen experimentally. At frequencies below the resonances the effective elastic constants are negative. This can be understood physically as follows. In any harmonic motion, the acceleration, and hence the force, is always 180° out of phase with the displacement. That is because the acceleration is the second time derivative of the displacement. As frequencies below the resonances, the motion of the solid particle is in-phase with the matrix displacement. The resulting force exerted by the solid particle on the matrix is in-phase with the displacement and hence 180° out of phase with the force in the matrix. This cancellation of the forces means that as seen by the waves, there is a "softening" of the material that eventually turns into negative elastic constants when the force exerted by the solid particle exceeds that of the force in the matrix. When the frequency exceeds the resonance frequency, the motion of the particle becomes out of phase with the matrix displacement. Consequently, the force becomes in-phase, and there is a stiffening of the effective elastic constant as seen by the waves.

Figure 5:
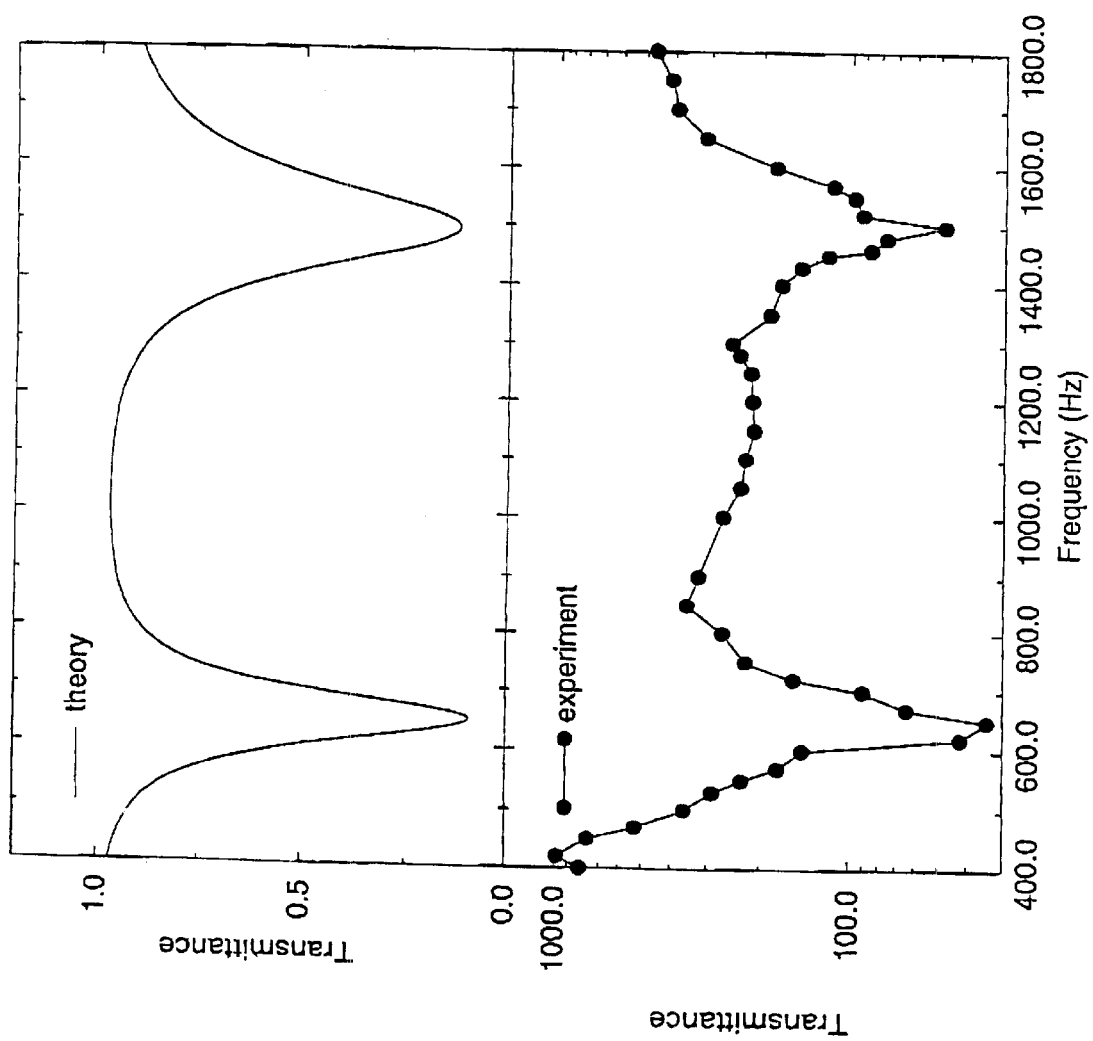
FIG. 5 provides a graphical representation of the theoretical and actual experimental values of one embodiment of the invention.

The negative effective elastic constants have direct implications for the wave propagation characteristics of the composite material. To illustrate that, we calculated the wave transmission coefficient as a function of frequency. The results are shown in FIG. 5, together with a comparison with the experimental data. The agreement, in terms of the frequency positions of the transmission minimum, can be observed.

A variety of different embodiments are possible and suitable to particular frequencies which are desired to be suppressed, shielded or absorbed. As mentioned previously, the use of uniform spherical balls "A" may provide a particular response at a particular frequency. However, variation in the size of these items may provide responses at different frequencies and the use of a mixture of sizes may provide sound insulation over a variety of desired frequencies. Furthermore, the high density particles "A" do not need to be spherical in shape. If a high response to particular frequency is sought, consistency in the particles may be desired and spherical objects may be easier to utilize. For especially low frequencies, cylindrical bars of the rigid material coated by a layer of soft elastic material may be used in place of coated spherical balls.

Alternatively, other shapes or irregular shapes may be used which may also provide a broadening of the range of frequencies which are shielded by the material.

The particular materials for the items may involve a number of suitable materials. The material for the particle "A" should be relatively high density and high rigidity compared with the softer layer in which it is embedded. The particular relative density between the two materials will affect the frequency of resonance and any stable material might be used for this purpose.

With regard to the material "B", this should be significantly softer than the material "A". As the elastic constant of the soft material "B" also affects frequency resonance, this also needs to be selected although generally such soft materials as rubber or polymeric materials having similar properties can be utilized.

The matrix material "C" should be of a rigidity than the soft elastic material "B". Otherwise, the properties of the matrix material "C" are to be determined by the in use of the composite product and, as mentioned previously, can be any arbitrary structural materials such as plastic, polymer-cement, organic glass or other such materials.

Thus it can be seen that a composite material as provided which may have one or more resonance frequencies at which sound wave propagation significantly inhabited. The matrix material may provide composite material having good structural properties and yet provide shielding of relatively low frequency sounds with a relatively thin composite material.

Composite materials can be tuned through the selection of materials in sizes and shapes of the particles to attack particular frequencies or a broader range may be provided through a mix of particle sizes and shapes.

In particular, composite materials with embedded coated particle units having acoustic resonance frequencies can be tuned by the densities, sizes and shapes of the rigid core "A", plus the thicknesses and elastic properties of the soft coating "B". Mixtures of these units may be provided in a single overall composite.

In a preferred embodiment, the coated particle units of solid particles coated by the soft elastic material have mechanical resonances with resonance frequencies ranging from below 2000 Hz. Preferably the range may be 10 Hz to 2000 Hz.

While the present invention has been described with reference to preferred embodiment, it will be appreciated by those skilled in the art that variations, modifications and the applications of the invention may be made without departing from the scope of the invention as defined in the appended claims.

What is claimed is:

1. A composite material comprising:
    a matrix material being a general structural material;
    a plurality of discrete zones of soft elastic material embedded within said matrix;
    zones of solid material embedded within said zones of soft elastic material, wherein said solid material has a higher mass density and rigidity than those of said soft elastic material; and
    wherein said embedded zones of solid material within said soft elastic material have mechanical resonances with resonance frequencies below 2000 Hz.

2. A composite material according to claim 1, wherein said embedded zones of solid, relatively high density and high rigidity material comprise regular shape particles.

3. A composite material according to claim 2, wherein said regular shape particles comprise spherical particles.

4. A composite material according to claim 2, wherein said regular shape particles comprise cylindrical rods within said material.

5. A composite material according to claim 1, wherein said matrix material comprises plastic, metal, glass, or polymer-cement materials.

6. A composite material according to claim 1, wherein said soft elastic material comprises a rubber material.

7. A composite material according to claim 1, wherein said solid, relatively high density and high rigidity materials comprise metal particles.

8. A composite material according to claim 6, wherein the rubber material is a synthetic rubber material.

9. The method of claim 1, wherein at least one of (1) the size of the solid material, (2) the shape of the solid material, (3) the density of the solid material, (4) the thickness of the soft elastic material, and (5) the elasticity of the soft elastic material is effective to yield the embedded zones of solid material having mechanical resonances with resonance frequencies below 2000 Hz.

10. A method of making a composite material having negative elastic constants at resonance frequencies below 2000 Hz comprising:
    embedding solid particles of relatively high density and high rigidity within regions of softer elastic material, wherein the embedded solid particles form embedded zones of solid material;
    said regions of softer elastic material being embedded within a matrix material to provide a structural composite material; and
    wherein the embedded zones of solid material within the regions of softer elastic material have mechanical resonances with resonance frequencies below 2000 Hz.

11. A method of making a composite material according to claim 10, wherein said embedded zones of solid, relatively high density and high rigidity material comprise regular shape particles.

12. A method of making a composite material according to claim 11, wherein said regular shape particles comprise spherical particles.

13. A method of making a composite material according to claim 11, wherein said regular shape particles comprise cylindrical rods within said material.

14. A method of making a composite material according to claim 10, wherein said matrix wherein material comprises plastic, metal, glass, or polymer-cement materials.

15. A method of making a composite material according to claim 10, wherein said soft elastic material comprises a rubber material.

16. A method of making a composite material according to claim 10, wherein said solid, relatively high density and high rigidity materials comprise metal particles.

17. A method of making a composite material according to claim 15, wherein the rubber material is a synthetic rubber material.

18. The method of claim 10, wherein at least one of (1) the size of the solid particles, (2) the shape of the solid particles, (3) the density of the solid particles, (4) the thickness of the softer elastic material, and (5) the elasticity of the softer elastic material is effective to yield the embedded zones of solid material having mechanical resonances with resonance frequencies below 2000 Hz.

19. A method of insulating against low frequency sound with frequencies below 2000 Hz comprising providing the composite material of claim 1 to insulate against said sound.

20. The method of insulating against low frequency sound according to claim 19, wherein said embedded zones of solid, relatively high density and high rigidity material comprise regular shape particles.

21. The method of insulation against low frequency sound according to claim 20, wherein said regular shape particles comprises spherical particles.

22. The method of insulating against low frequency sound according to claim 20, wherein said regular shape particles comprise cylindrical rods within said material.

23. The method of insulating against low frequency sound according to claim 19, wherein said matrix material comprises plastic, metal, glass, or polymer-cement materials.

24. The method of insulating against low frequency sound according to claim 19, wherein said soft elastic material comprises a rubber material.

25. The method of insulating against low frequency sound according to claim 24, wherein said soft elastic material comprises a synthetic rubber material.

26. The method of insulating against low frequency sound according to claim 19, wherein said solid, relatively high density and high rigidity materials comprises metal particles.

* * * * *